(12) United States Patent
Morel et al.

(10) Patent No.: US 10,696,223 B2
(45) Date of Patent: Jun. 30, 2020

(54) METHOD FOR PROJECTING AN IMAGE BY A PROJECTION SYSTEM OF A MOTOR VEHICLE, AND ASSOCIATED PROJECTION SYSTEM

(71) Applicant: VALEO VISION, Bobigny (FR)

(72) Inventors: Xavier Morel, Bobigny (FR); Stephan Sommerschuh, Bobigny (FR); Hafid El-Idrissi, Bobigny (FR); Weicheng Luo, Bobigny (FR)

(73) Assignee: VALEO VISION, Bobigny (FR)

( * ) Notice: Subject to any disclaimer, the term of this patent is extended or adjusted under 35 U.S.C. 154(b) by 62 days.

(21) Appl. No.: 15/720,412

(22) Filed: Sep. 29, 2017

(65) Prior Publication Data

US 2018/0086262 A1 Mar. 29, 2018

(30) Foreign Application Priority Data

Sep. 29, 2016 (FR) ...................................... 16 59286

(51) Int. Cl.
*B60Q 1/50* (2006.01)
*G09G 5/02* (2006.01)
(Continued)

(52) U.S. Cl.
CPC ............... *B60Q 9/00* (2013.01); *B60Q 1/085* (2013.01); *G06K 9/00791* (2013.01);
(Continued)

(58) Field of Classification Search
CPC .............. B60R 1/00; B60R 2300/8093; B60R 2300/301; B60R 2300/302;
(Continued)

(56) References Cited

U.S. PATENT DOCUMENTS 6,462,769 B1 10/2002 Trowbridge et al.
10,053,001 B1 * 8/2018 Nabbe ...................... B60Q 1/50
(Continued)

FOREIGN PATENT DOCUMENTS

EP 2 896 937 A1 7/2015
WO WO 00/35200 A1 6/2000

OTHER PUBLICATIONS

French Preliminary Search Report dated May 18, 2017 in French Application 16 59286 filed on Sep. 29, 2016 (with English Translation of Categories of Cited Documents).

*Primary Examiner* — Alison Slater
(74) *Attorney, Agent, or Firm* — Oblon, McClelland, Maier & Neustadt, L.L.P.

(57) ABSTRACT

A method for projecting at least one image, by a projection system of a motor vehicle. The method includes the following steps: detecting a disruption area, determining the position of the driver in a predefined reference frame referred to as the projection reference frame, calculating a transformation matrix for transforming an image depending on the determined position of the driver, generating the control signal, the control signal being obtained by applying said transformation matrix to at least one stored image, controlling the imaging device from the control signal so as to project a transformed image, the pictogram appearing in a vertical plane (PV) to said driver in the transformed image, and projecting the transformed image.

19 Claims, 13 Drawing Sheets

(51) Int. Cl.
| | |
|---|---|
| *G09G 5/04* | (2006.01) |
| *H04N 5/66* | (2006.01) |
| *H04N 9/31* | (2006.01) |
| *B60Q 9/00* | (2006.01) |
| *G06K 9/78* | (2006.01) |
| *G06K 9/00* | (2006.01) |
| *G08G 1/16* | (2006.01) |
| *G06K 9/46* | (2006.01) |
| *G06K 9/20* | (2006.01) |
| *B60Q 1/08* | (2006.01) |

(52) U.S. Cl.
CPC ....... *G06K 9/00845* (2013.01); *G06K 9/2036* (2013.01); *G06K 9/4661* (2013.01); *G06K 9/78* (2013.01); *G08G 1/162* (2013.01); *G08G 1/166* (2013.01); *H04N 9/3185* (2013.01); *B60Q 2300/32* (2013.01); *B60Q 2400/50* (2013.01)

(58) Field of Classification Search
CPC .......... B60R 2300/305; B60R 2300/60; B60K 2370/334; B60K 2370/179; B60K 2370/178; B60K 2370/191; B60K 28/066; B60K 31/0008; B60K 2370/15; B60K 2370/186; B60K 2370/1868; B60K 2370/193; B60K 2370/349; B60K 2370/797; B60Q 2400/50; B60Q 9/008; B60Q 1/503; B60Q 1/525; B60Q 1/085; B60Q 1/50; B60Q 1/52; B60Q 2300/45; G08G 1/166; G08G 1/0112

See application file for complete search history.

(56) References Cited

U.S. PATENT DOCUMENTS

| | | | |
|---|---|---|---|
| 2004/0066376 A1* | 4/2004 | Donath | B60R 1/00 345/169 |
| 2011/0103651 A1* | 5/2011 | Nowak | G01C 21/3647 382/106 |
| 2014/0049384 A1 | 2/2014 | Mueller | |
| 2014/0160012 A1* | 6/2014 | Su | G06F 3/005 345/156 |
| 2015/0203023 A1 | 7/2015 | Marti et al. | |
| 2015/0298598 A1* | 10/2015 | Nussli | B60Q 1/2665 345/2.2 |
| 2015/0332654 A1* | 11/2015 | Geloen | G02B 27/01 345/697 |
| 2016/0259528 A1* | 9/2016 | Foss | G06F 3/04817 |
| 2017/0043712 A1* | 2/2017 | Paszkowicz | B60Q 1/24 |
| 2017/0154554 A1* | 6/2017 | Tanaka | B60R 1/00 |
| 2017/0305332 A1* | 10/2017 | Albou | F21S 43/13 |
| 2018/0050698 A1* | 2/2018 | Polisson | B60W 30/182 |
| 2018/0151075 A1* | 5/2018 | Claesson | H04W 4/029 |
| 2018/0233048 A1* | 8/2018 | Andersson | G06K 9/00805 |

* cited by examiner

METHOD FOR PROJECTING AN IMAGE BY A PROJECTION SYSTEM OF A MOTOR VEHICLE, AND ASSOCIATED PROJECTION SYSTEM

The present invention concerns the field of road safety and motor vehicle lighting.

Roadways are sometimes disrupted by road repair works, work thinning vegetation growing on the verges or on the median strip, road marking maintenance work, or simply by rough patches in the surface such as hollows or potholes.

Such disruptions are generally indicated by road signs. Nevertheless, drivers are often surprised by the appearance of such disruption areas and have problems quickly changing lane, changing the driving line of their vehicle or simply adapting their driving speed as quickly as necessary.

Therefore, accidents are sometimes caused by these disruption areas on roads. It is desirable to complement the indications provided by road signs in disruption areas with additional signalling.

To this end, the invention concerns a method for projecting at least one image, by a projection system of a motor vehicle comprising a detection device capable of detecting a disruption area and generating a warning signal, a processing unit capable of generating a control signal, an imaging device capable of receiving the control signal and projecting a digital image, and a storage unit storing at least one image representative of a pictogram, characterized in that the method comprises the following steps:
 a) detecting a disruption area,
 b) transmitting a warning signal, and
upon receiving the warning signal:
 c) generating a control signal, said generation step comprising the following sub-steps:
  determining the position of the driver in a predefined reference frame referred to as the projection reference frame,
  calculating a transformation matrix for transforming an image depending on the determined position of the driver,
  generating the control signal, the control signal being obtained by applying said transformation matrix to at least one stored image,
 d) controlling the imaging device from the control signal so as to project a transformed image, the pictogram appearing in a vertical plane to said driver in the transformed image, and
 e) projecting the transformed image.

Advantageously, the projection method and the projection system according to the invention offer additional signalling that can be easily and quickly removed.

This additional signalling is particularly suited to temporary disruption areas such as disruption area caused by roadworks, mudslides or rockslides, a broken-down car parked on the road, traffic accidents, etc.

According to specific embodiments, the projection method according to the invention comprises one or more of the following features:
 the transformation matrix is designed to pivot the stored image by an angle of 90° relative to a horizontal axis A extending over the roadway, said horizontal axis being perpendicular to the direction of movement of the vehicle.
 the step of generating a control signal further comprises a step of adding at least one area of shadow to said transformed image such that the pictogram shown in the transformed image is perceived in 3D by said driver.
 the detection device comprises a receiver capable of receiving an electromagnetic signal, and a geographical location system of the vehicle, and the step of detecting the disruption area comprises the following steps:
  determining the geographical position of the motor vehicle;
  receiving an electromagnetic signal capable of indicating at least one disruption area on the roadway;
  determining the possibility of the motor vehicle travel through the disruption area;
  producing a warning signal when the motor vehicle is going to travel through the disruption area.
 the electromagnetic signal is a radio-frequency signal chosen from a program signal, a wireless telecommunication network signal and a computer network signal governed by the communication protocol defined by IEEE 802.11 group standards.
 the electromagnetic signal is a light signal, for example a signal that has a wavelength of between 400 and 800 nanometers.
 the projection system comprises a camera, and the detection step comprises the following steps:
 acquiring at least one image representative of the roadway, by said camera, and
 processing said at least one acquired image in order to detect the existence of a disruption area
 producing a warning signal.
 the pictogram is an image representative of an element chosen from a traffic cone, a road sign, lines or guide arrows and temporary roadwork signs.
 The method further comprises a step of capturing an image of the driver of the motor vehicle, and the step of determining the position of the driver is implemented using the captured image.

The invention also concerns an image projection system of a motor vehicle, for projecting at least one image, said projection system comprising:
 a storage unit suitable for storing at least one image representing a pictogram;
 a detection device capable of detecting a disruption area, said detection device being designed to generate a warning signal upon detection of the disruption area,
 a processing unit connected to the detection device, the processing unit being capable of calculating a transformation matrix depending on the position of the driver defined in a predefined reference frame referred to as the projection reference frame, and of generating a control signal from the transformation matrix and the stored image, and
 an imaging device capable of projecting at least one transformed image from the received control signal, the transformed image being intended to appear in a vertical plane to said driver of the motor vehicle.

As a variant, the projection system comprises a light source capable of emitting a light beam towards the imaging device, and a projection device capable of projecting the transformed image onto the roadway.

As a variant, the projection system comprises an imager capable of capturing an image of the driver of the motor vehicle and the processing unit is capable of searching for the position of the driver in the captured image and of defining the transformation matrix M from the determined position of the driver.

The invention will be more clearly understood upon reading the description that follows, which is provided purely as a non-limiting example, with reference to the figures in which:

FIG. 1 is a schematic view of the projection system, according to a first embodiment of the invention, FIG. 2 is a diagram representing the main steps of the projection method according to the invention, FIG. 3 is a diagram representing the steps of a first embodiment of the detection step of the projection method according to the invention, FIG. 4 is a side view of a vehicle equipped with a projection system according to the invention, FIG. 5 is a perspective view of traffic cones that can be imaged by the projection method according to the present invention, FIG. 6 is a diagram representing the steps of a second embodiment of the detection step of the projection method according to the invention, and FIGS. 7 to 23 are figures from patent application PCT/EP2016/071596 filed on 13 Sep. 2016.

The projection method according to the present invention is implemented by a projection system 2 represented schematically in FIG. 1.

This projection system 2 comprises a device 4 for detecting the presence of a disruption area, a storage unit 6 capable of storing images to be projected and coordinates of the position of the driver, and a processing unit 10 connected to the detection device 4, the storage unit 6 and the imager 8.

The detection device can be produced according to two different embodiments.

According to a first embodiment of the invention, the detection device 4 comprises a receiver 3 capable of receiving an electromagnetic signal emitted by a remote terminal outside the vehicle, and a geographical location system 5 of the vehicle.

The receiver 3 can, for example, consist of a car radio. In this case, the electromagnetic signal is a program signal, for example a TMC (Traffic Message Channel) signal. TMC is a European standard that allows traffic information to be broadcast to road users, generally via the RDS (Radio Data System) in the FM radio frequency band. The remote terminal is the transmission device of the radio.

The receiver 3 can also consist of a mobile phone receiver. In this case, the electromagnetic signal is a mobile phone network signal, for example a GSM (Global System for Mobile communication) signal, a GPRS (Global Packet Radio Service) signal, or a UMTS (Universal Mobile Telecommunication System) signal. The wireless telecommunications network is, for example, defined by the 3G or 4G standard.

The receiver 3 can further consist of a computer or tablet receiver. In this case, the electromagnetic signal is a computer network signal governed by a communication protocol as defined by the IEEE 802.11 standard, for example a Wi-Fi (Wireless Fidelity) signal.

Finally, the receiver 3 can consist of a camera. The electromagnetic signal is then a VLC (Visible Light Communication) signal. This signal has a wavelength of between 400 and 700 nanometers. It can be transmitted by traffic lights or road lighting infrastructures such as street lamps.

The location system 5 is capable of determining the geographical position of the vehicle. It consists, for example, of a GPS (Global Positioning System) device.

According to a second embodiment of the invention not shown here, the detection device 4 comprises a camera capable of imaging the roadway and a processor connected to the camera and capable of analyzing the images captured by the camera in order to determine the presence of a rough patch on the roadway, such as the presence of a hole on the roadway, for example.

The storage unit 6 is a ROM, UVPROM, PROM, EPROM or EEPROM memory. It is capable of storing images, each of which shows a pictogram. A pictogram is a graphic sign representative of a situation, the meaning of which is likely to be understood quickly. A pictogram may comprise a figurative drawing and/or alphanumeric symbols. The pictograms can, for example, represent one or more traffic cones, a road sign, lines or guide arrows or temporary work signs.

The storage unit 6 is also capable of storing the coordinates of the position of the driver in a predefined reference frame referred to as the projection reference frame Rp. This reference frame Rp is shown in FIG. 4. In particular, the storage unit 6 stores the coordinates of the position of the driver's eyes in this reference frame Rp. This position is an average position established based on the positions of the eyes of multiple drivers of different heights or different body shapes.

The processing unit 10 is a processing calculation unit.

The projection system 2 according to the invention further comprises a light source 16 capable of emitting a light beam, an imaging device 18 capable of imaging a digital image from the light beam originating from the light source 16 and the control signal, and a projection device designed to project the image onto the roadway.

The light source 16 consists, for example, of a light-emitting diode and a collimator. As a variant, the light-emitting diode is replaced by a laser source.

The imaging device 18 consists, for example, of an array of micro-mirrors. The array of micro-mirrors is generally denoted by the acronym DMD, standing for Digital Micro-Mirror Device. It comprises a large number of micro-mirrors distributed into rows and columns. Each micro-mirror is suitable for receiving a portion of the light beam emitted by the light source 16 and of reflecting it towards the projection device 20 or towards a light absorber. The set of micro-mirrors is designed to project a digital image.

The projection device 20 generally comprises an input lens and an output lens. These lenses are made from plastic material and/or from glass.

The output lens is, for example, a convex lens.

According to an embodiment not shown here, the storage unit 6 does not comprise the coordinates of the position of the driver in the projection reference frame Rp.

In this embodiment, the projection system comprises an imager connected to the processing unit. The imager is capable of imaging the driver of the motor vehicle. The imager consists, for example, of a camera. The camera of the driver monitoring device can be used. The processing unit is capable of searching for the position of the driver in the captured image by means of image processing. This image processing operation is carried out, for example, using edge detection. In particular, the processing unit searches for the position of the driver's eyes in the captured image. Next, the position of the driver's eyes is defined in a reference frame Rp located on the projection device.

In reference to FIG. 2, the projection method according to the present invention starts with a step 30 of detecting a disruption area.

This detection step 30 can be carried out according to two different embodiments. According to the first embodiment of the invention shown in FIG. 3, the detection step comprises a step 32 of determining the geographical position of the motor vehicle. This geographical position is defined on a road map such as that generally used in GPS devices.

During a step 34, the detection device 4 receives an electromagnetic signal capable of indicating a geographical disruption area on the roadway, and a piece of information concerning the type of disruption.

During a step 36, the detection device determines whether or not the vehicle is going to travel through the disruption area 38 detected by the detection device 4. If this is the case, the detection device 4 produces a warning signal during a step 40.

During a step 42, the detection device 4 transmits the warning signal to the processing unit 10. The warning message contains the information concerning the type of disruption and its exact location on the roadway, for example if the disruption is only on the edge of the road or on the median strip, or if it is a disruption in the right-hand lane.

Upon receiving this warning signal, the position of the driver is determined in the projection reference frame Rp, during a step 44. This determination is carried out by searching for coordinates in the storage unit 6. In particular, the coordinates of the position of the driver's eyes are searched for.

During a step 46, the processing unit 10 is capable of calculating a transformation matrix M depending on the position of the driver's eyes in the projection reference frame Rp. This transformation matrix M is designed in such a way as to generate a transformed image. The transformed image appears to the driver to extend in a vertical plane PV, as shown in FIG. 4. The transformation matrix M is designed to pivot the stored image by an angle of 90° relative to a horizontal axis A extending over the roadway, perpendicular to the direction of movement of the vehicle.

Thus, the driver of the vehicle does not have the impression of viewing an image extending flat on the roadway in the area ZP defined in bold in FIG. 4, but has the impression of viewing an image that appears to extend vertically in the area referenced I in FIG. 4. In reality, the image is indeed projected onto the area ZP of the roadway.

One way of calculating this transformation matrix was the subject of a previous patent application filed on 13 Sep. 2016 under number PCT/EP2016/071596. This previous patent application has not yet been published. This previous patent application has been reproduced at the end of the description of the present patent application in order to give an implementation example for the present invention.

During a step 48, the processing unit 10 selects an image showing a specific pictogram from all of the images stored in the storage device, depending on the information contained in the warning message transmitted by the detection device 4. The selected image is transmitted from the storage unit 6 to the processing unit 10. Therefore, when the disruption relates to roadworks along the edges of the roadway, the processing unit 10 selects an image representative of a row of traffic cones, as shown in FIG. 5.

During a step 50, the transformation matrix M is applied to the image originating from the storage unit. This application is implemented by multiplying the transformation matrix by the stored image. This multiplication deforms the projected image in order to produce a transformed image. The transformed image gives the visual impression that it is an actual object in the form of a pictogram placed on the roadway and extending vertically. This application is implemented by multiplying the transformation matrix by the stored image.

During a step 52, the processing unit 10 adds areas of shadow to the transformed image to give the driver the visual impression that the pictogram shown in the transformed image is displayed in 3D. This addition of areas of shadow is carried out using known image processing techniques.

FIG. 5 therefore shows an example of the visual impression perceived by the driver of the motor vehicle, of three traffic cones placed on the edge of the roadway. This visual impression is obtained by implementing the projection method according to the present invention.

During a step 54, the processing unit generates a control signal representative of the transformed image.

During a step 56, the control signal is transmitted to the imaging device 18 which images the transformed image and projects it towards the projection device 20.

During a step 58, the projection device 20 projects the transformed image onto the roadway. The projected pictogram appears to the driver in a vertical plane PV. Other observers, such as passengers in the vehicle or people outside the vehicle, see a deformed image. They do not necessarily see the pictogram.

The detection step 30 can be implemented by the detection device according to the second embodiment of the invention. In this case, the detection step comprises, in reference to FIG. 6, a step 60 of acquiring at least one image representative of the roadway by a camera attached to the front of the vehicle.

The acquired image is transmitted to the detection device 4. During a step 62, the detection device processes said image to determine if there is a rough patch on the ground, such as a pothole.

If there is a rough patch, the detection device 4 detects the existence of a disruption area and produces a warning signal during a step 64. The warning signal contains the information concerning the type of disruption. The warning signal is transmitted to the processing unit 10 and the steps of the projection method proceed in the same way as described above for the projection method according to the first embodiment of the invention.

In a variant of step 44 not shown here, the processing unit 10 controls an imager such that it acquires an image of the driver sat in the motor vehicle. The captured image or images are transmitted to the processing unit 10.

Next, the position of the driver, and in particular the driver's eyes, is searched for in the captured image by means of image processing. This image processing operation is carried out by the processing unit 10, for example using edge detection. Next, the position of the driver's eyes is defined in a reference frame located on the projection device 10. This reference frame is referred to as the projection reference frame Rp. It is shown in FIG. 4.

According to a particularly advantageous variant, the contrast profile of the projected pictogram is enhanced relative to the average light environment of the background beam, on which or in which the pictogram is included.

To this end, the edges of the pictogram, from the outside of same towards the inside and in at least one dimension (width or height) of the projection plane of the pictogram, comprise at least two alternating areas in which the intensity differs relative to the average intensity of the background beam, a first area being more intense than or less intense than said average intensity, and the second area being respectively less intense than or more intense than said average intensity. In one embodiment, the second area constitutes the core or central area of the pictogram and is thus bordered, at least in one dimension, by the first area.

This enhances the perception of the driver or third parties of the message represented by the projected pictogram, reducing the time needed to react to the projected message and therefore improving driving safety.

The intensity gradient and the level of intensity applied can be constant or can vary along the pattern in one direction of the dimension of projection in question (width or height; for example, respectively, from left to right or from bottom to top, corresponding to a projection from the near-field of the vehicle towards the horizon). Moreover, this variation can be static or dynamic, i.e. controlled depending on the vehicle's surroundings: for example, depending on the imminence of an event, the contrast can be decreased or increased dynamically, so as to generate a ripple effect in the pattern that is displayed more or less clearly in the background beam and attract the attention of the driver or third parties to the imminence of the event corresponding to the projected pictogram (exit or bend arrow, collision alert, pedestrian crossing the road, etc.). This increases driving safety still further.

Patent application number PCT/EP2016/071596 has been reproduced below.

Patent application PCT/EP2016/071596 and its various applications will be more clearly understood upon reading the description that follows and examining the accompanying figures.

Figure 1:
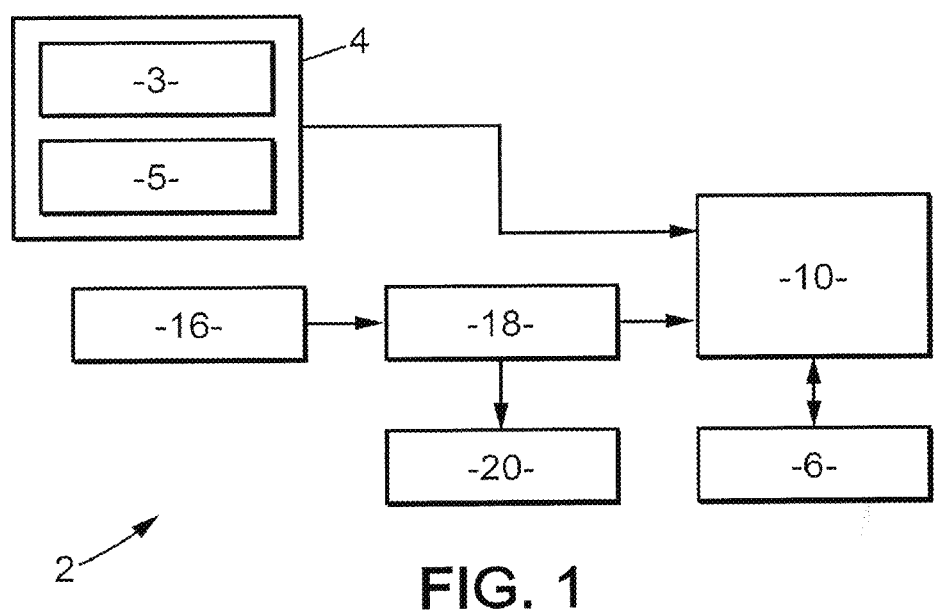
Figure 2:
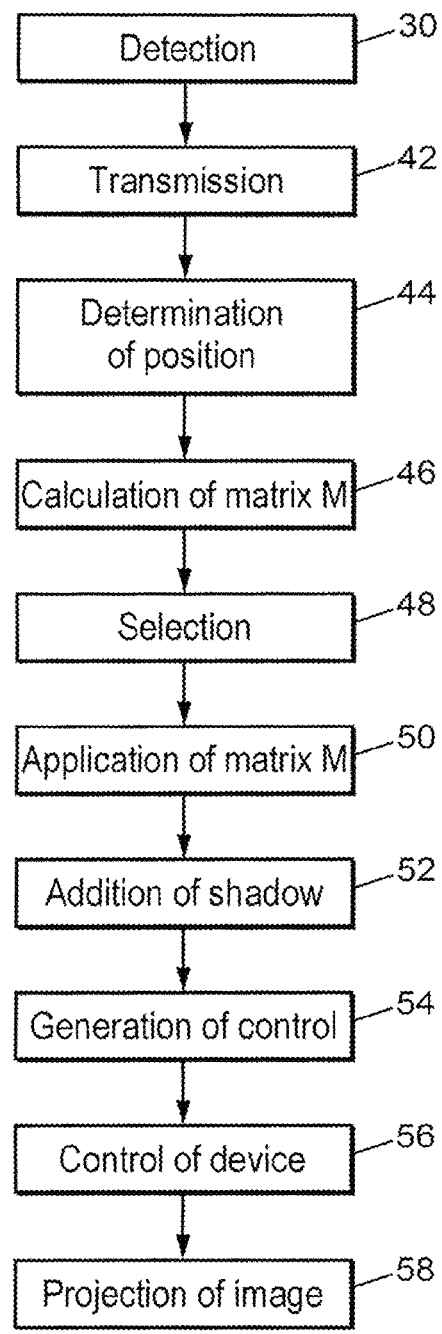
Figure 3:
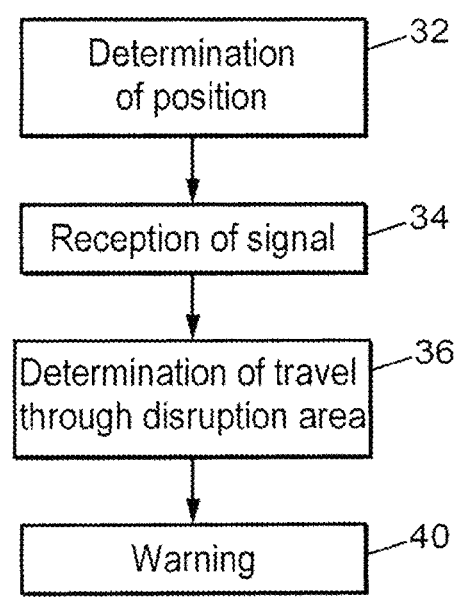
Figure 4:
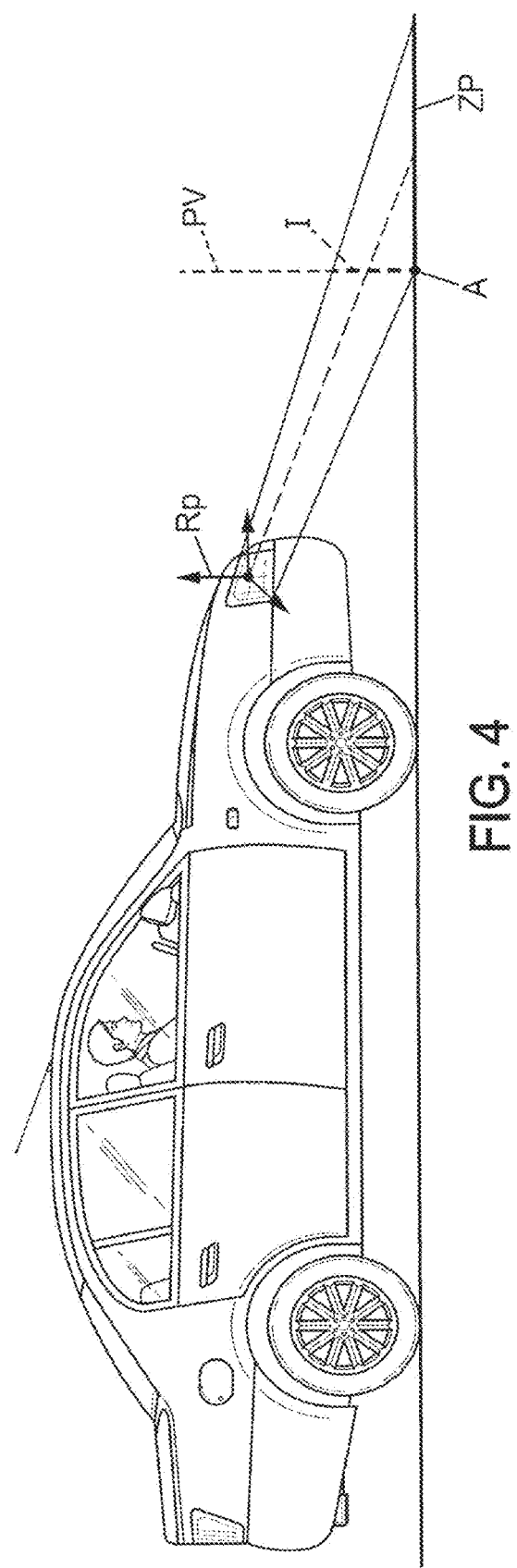
Figure 5:
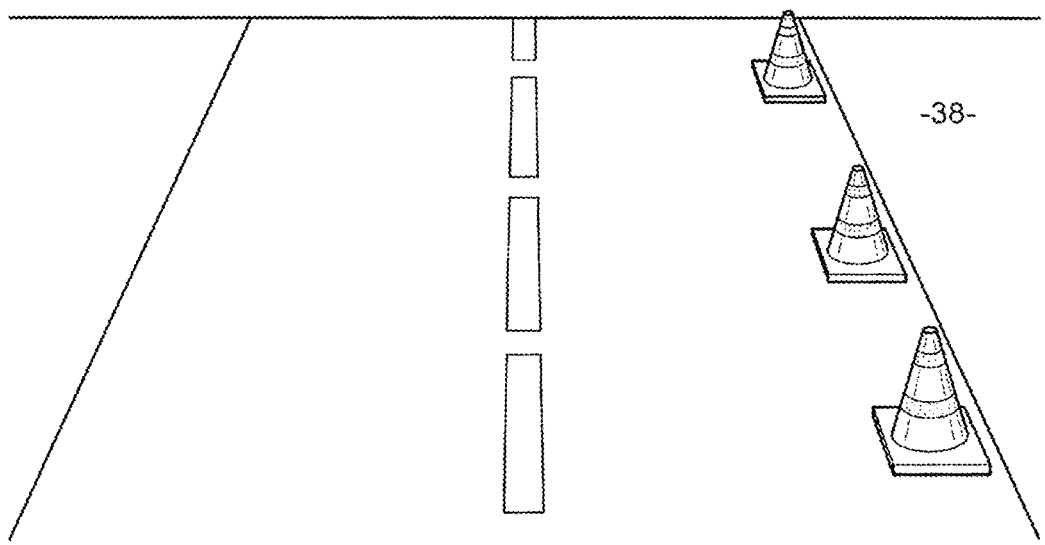
Figure 6:
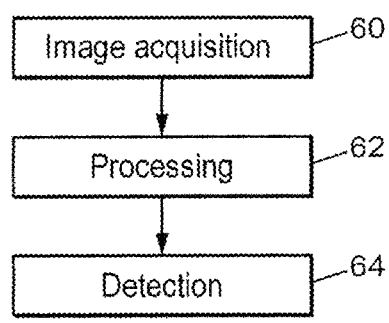
Figure 7:
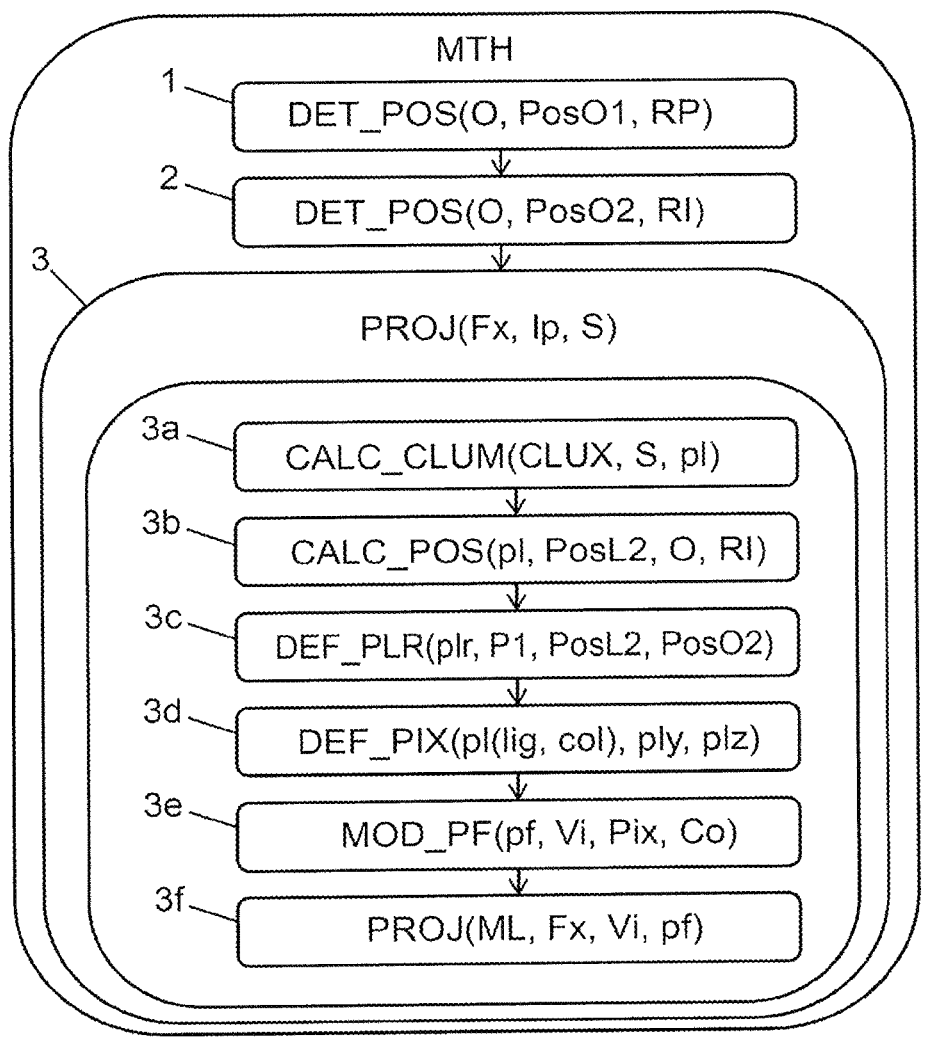
FIG. 7 shows a logical diagram of the steps of the method for projecting at least one image onto a projection surface according to a non-limiting embodiment of patent application PCT/EP2016/071596.
Figure 14:
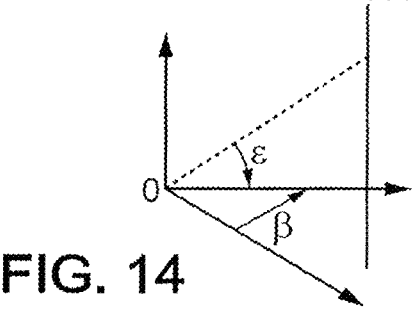
Figure 15:
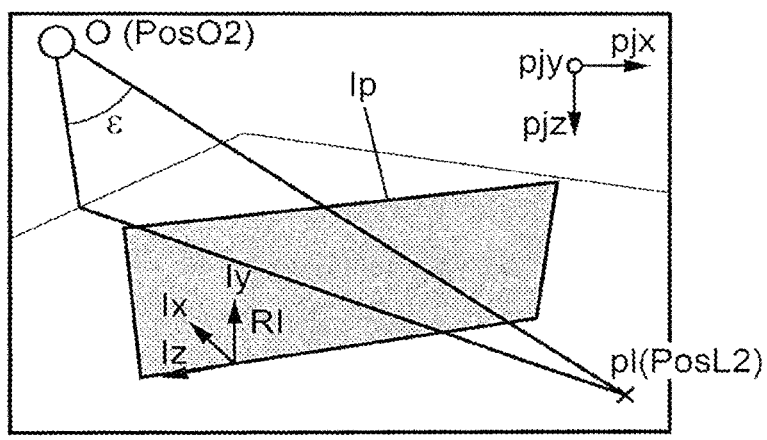
Figure 16:
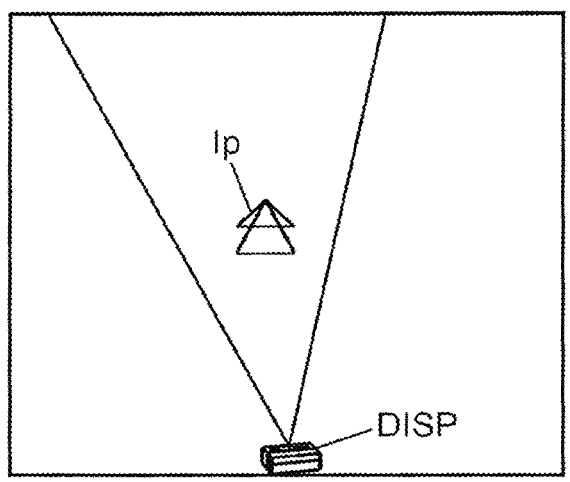
Figure 17:
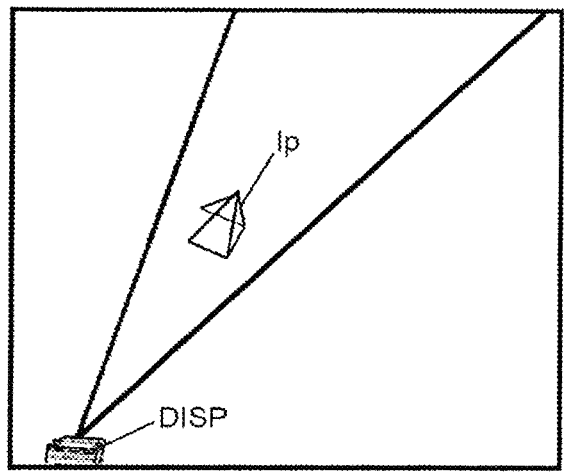
Figure 18:
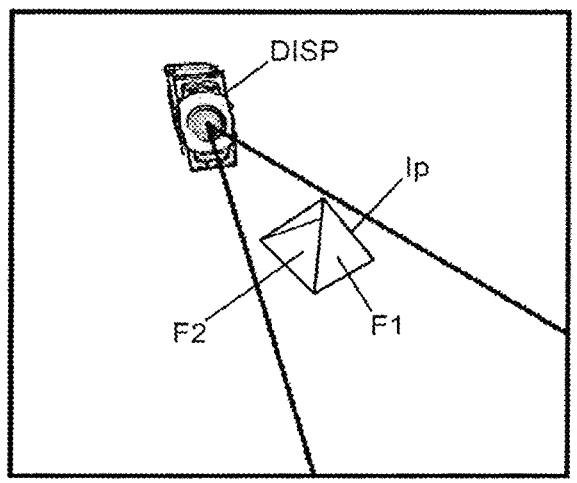
Figure 19:
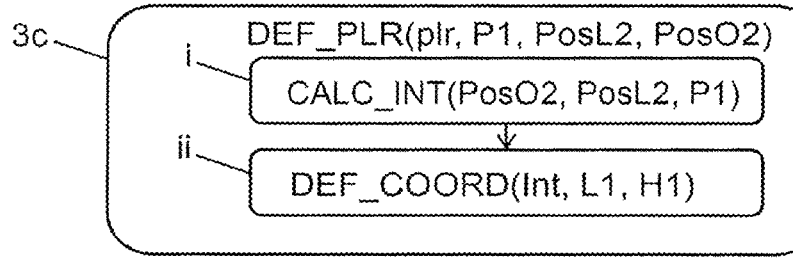
Figure 20:
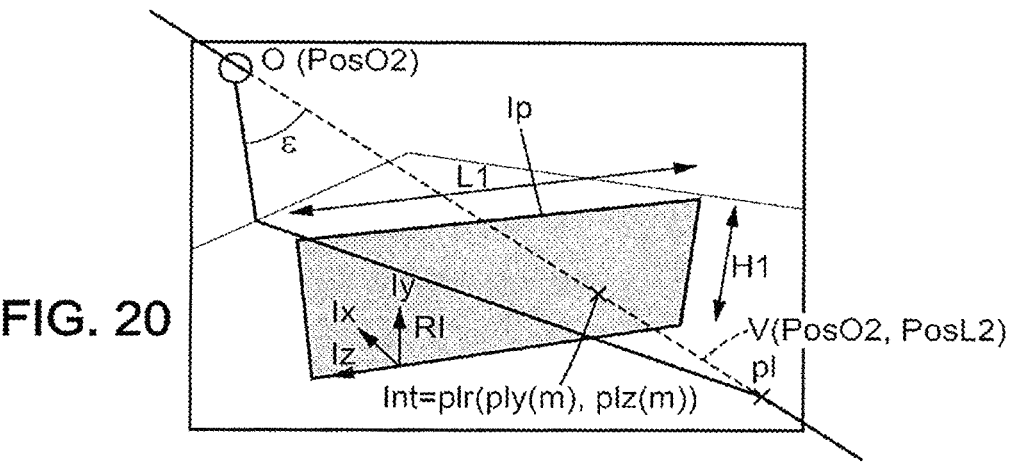
Figure 21:
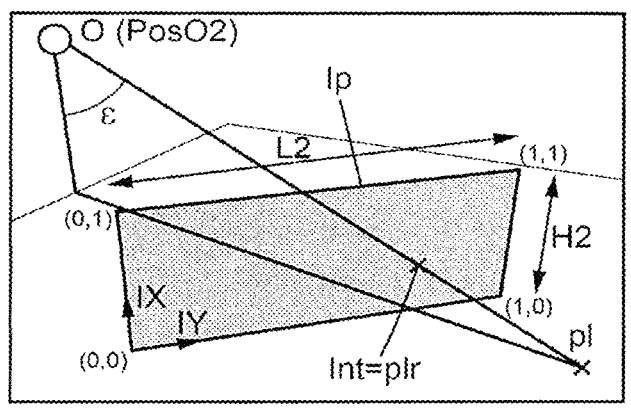
Figure 22:
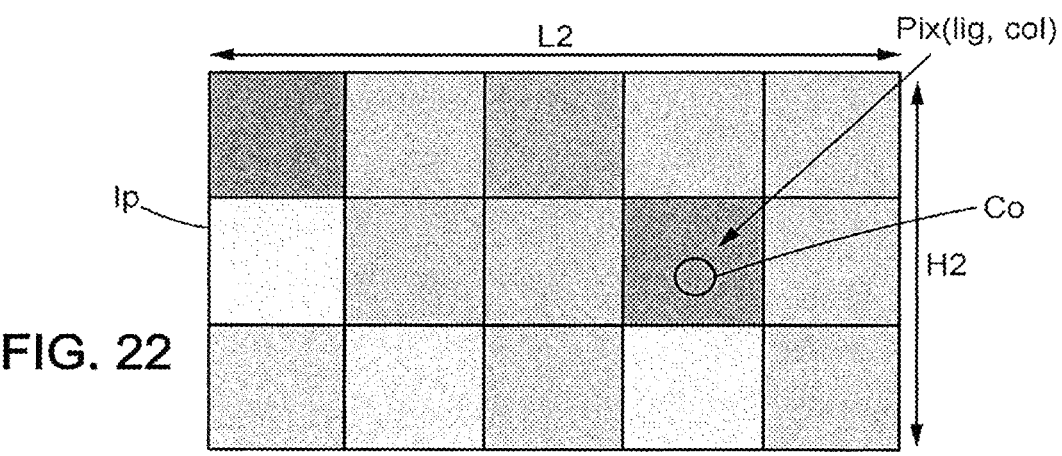
Figure 23:
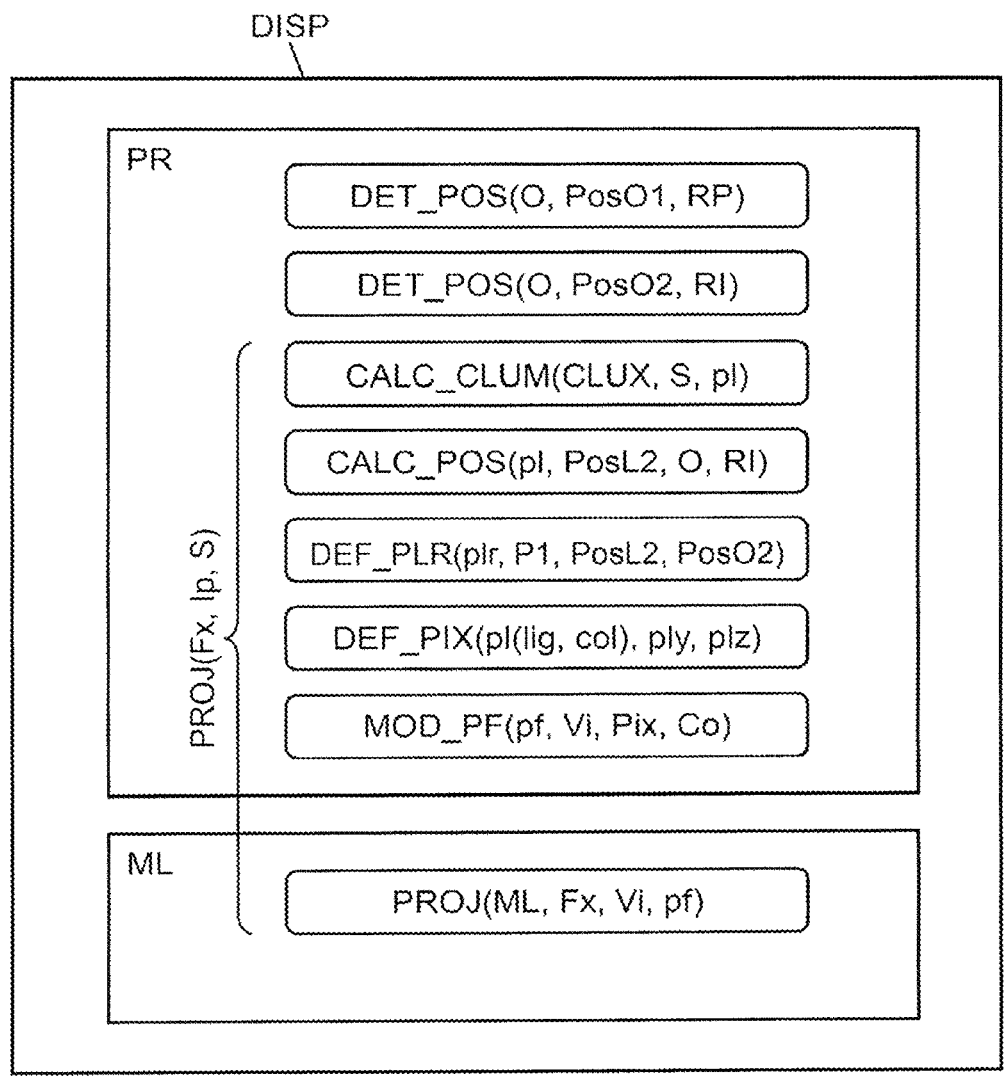

FIG. 14 indicates the elevation angle and the azimuth angle taken into consideration in a step of calculating the observation position of an observer in the projection method of FIG. 7;

FIG. 15 shows, schematically, a point of impact, an observation position of an observer outside the motor vehicle in an image reference frame and an image to be projected by the projection method of FIG. 7;

FIG. 16 shows an image projected according to the projection method of FIG. 7, viewed from the point of view of the driver of said motor vehicle but only comprehensible to an observer outside the motor vehicle;

FIG. 17 shows an image projected according to the projection method of FIG. 7, viewed from the point of view of a rear passenger of said motor vehicle but only comprehensible to an observer outside the motor vehicle;

FIG. 18 shows an image projected according to the projection method of FIG. 7, viewed from the point of view of said observer outside the motor vehicle and comprehensible to said observer outside the motor vehicle;

FIG. 19 shows a logical diagram illustrating sub-steps of a step for defining the coordinates of a projection of a luminance point of the projection method of FIG. 7 according to a non-limiting embodiment of patent application PCT/EP2016/071596;

FIG. 20 shows, schematically, the point of impact, the observation position of the observer outside the motor vehicle and the image to be projected in FIG. 15 by the projection method of FIG. 7 and the coordinates of the intersection between the point of impact and the image to be projected;

FIG. 21 shows, schematically, the point of impact, the observation position of the observer outside the motor vehicle and the image to be projected in FIG. 20, normalized; and FIG. 22 shows, schematically, pixels of the image to be projected in FIG. 20; and FIG. 23 shows a lighting device designed to implement the projection method of FIG. 7.

DESCRIPTION OF EMBODIMENTS OF PATENT APPLICATION

PCT/EP2016/071596

Unless otherwise indicated, the elements that are identical, in structural or functional terms, and appear in different figures, have been given the same references.

The projection method MTH, for a motor vehicle, for projecting at least one image onto a projection surface by means of a light module ML according to patent application PCT/EP2016/071596 is described in reference to FIGS. 7 to 23.

"Motor vehicle" should be understood to mean any motorized vehicle.

As shown in FIG. 7, the method MTH comprises the steps of:
  detecting an observation position PosO1 of an observer O in a light module reference frame RP (illustrated step DET_POS(O, PosO1, RP));
  calculating the observation position PosO2 of the observer O in an image reference frame RI (illustrated step DET_POS(O, PosO2, RI));
  projecting said image Ip onto said projection surface S depending on said observation position PosO2 of the observer O in said image reference frame RI, said image Ip being incorporated into said light beam Fx of the light module ML (illustrated step PROJ(Fx, Ip, S)).

As shown in FIG. 7, the projection of said image Ip comprises the sub-steps of:
  3a) from a light intensity map CLUX of the light module ML comprising a plurality of intensity indicators pf, calculating a luminance map CLUM on the projection surface S resulting in luminance points pl (illustrated step CALC_CLUM(CLUX, S, pl));
  3b) calculating the position PosL2 of each luminance point pl in the image reference frame RI (illustrated step CALC_POS(pl, PosL2, O, RI));

3c) from its position PosL2 and the observation position PosO2 of the observer O in said image reference frame RI, defining the coordinates ply, plz of the projection plr of each luminance point pl in the image plane P1 of said image to be projected Ip (illustrated step DEF_PLR(plr, P1, PosL2, PosO2));

3d) if said projection plr belongs to said image to be projected Ip, defining the coordinates lig, col of the corresponding pixel Pix (illustrated step DEF_PIX(pl (lig, col), ply, plz);

3e) for each projection plr of a luminance point pl belonging to said image to be projected Ip, correcting the intensity value Vi of the corresponding intensity indicator pf depending on the color Co of the corresponding pixel Pix (illustrated step MOD_PF(pf, Vi, Pix, Co)).

It should be noted that the first step 3a in particular, and step 3b in particular, can be carried out before the iterations of the subsequent steps. More generally, the described steps are not necessarily carried out in sequence, i.e. in a same iteration loop, but can be performed in different iterations, with different iteration frequencies.

The step of projecting the image Ip further comprises a sub-step 3f) of projecting the light beam Fx onto the projection surface S with the corrected intensity values Vi of the intensity indicators pf (illustrated step PROJ(ML, Fx, Vi, pf) in FIG. 7).

The projection method MTH is suitable for projecting one or more images Ip at the same time. Hereinafter in the description, the projection of a single image is used as a non-limiting example.

It should be noted that the projection can be to the front of the motor vehicle V, to the rear or to the sides.

The light module ML can be used to produce a light beam Fx, said light beam Fx comprising a plurality of light rays Rx oriented in different directions.

The light module ML can be used to modify the intensity value Vi of each intensity indicator pf, and is therefore a digital light module. As described below, the image to be projected Ip is thus incorporated into the light beam Fx of the light module ML.

It should be noted that the light intensity map CLUX is discretized so as to make it usable digitally.

The light module ML is considered to be a point light source based on which the space around said light source is discretized. Thus, an intensity indicator pf is a point of the space illuminated by the light module ML that is comprises a certain direction dir1 and a given intensity value Vi provided by the light module ML in said direction dir1. The direction dir1 is given by two angles $\theta$ and $\delta$ (described below).

In a non-limiting embodiment, the projection surface S is the ground (reference S1) or a wall (reference S2). The image that is projected Ip onto the ground or the wall is therefore a 2D image.

Figure 8:
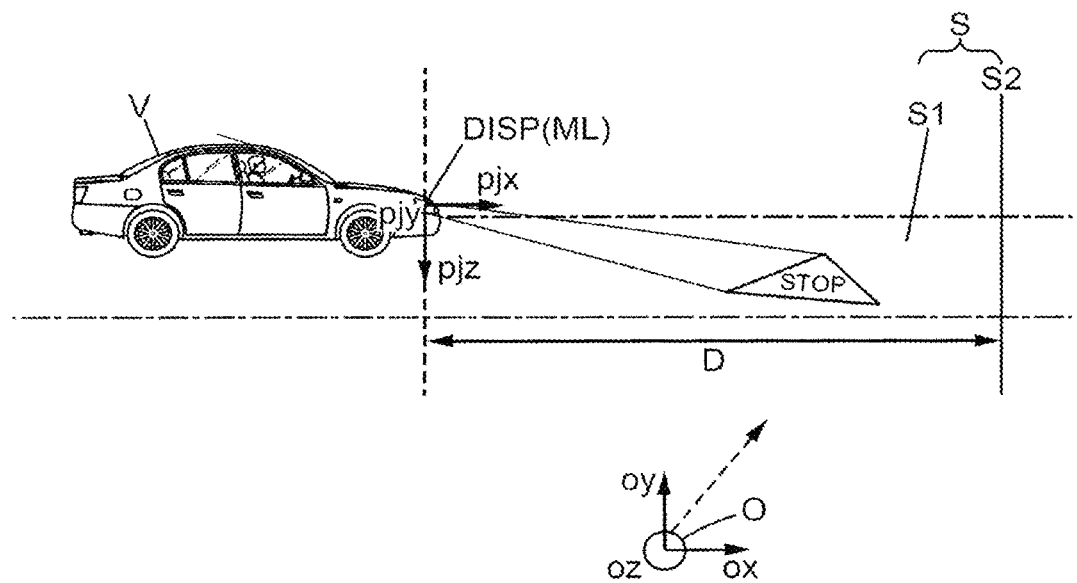
FIG. 8 shows a motor vehicle comprising a lighting device designed to implement the projection method of FIG. 7 according to a non-limiting embodiment of patent application PCT/EP2016/071596.

In a non-limiting embodiment shown in FIG. 8, a lighting device DISP of the motor vehicle V comprises at least one light module ML and is suitable for implementing the projection method MTH. In the non-limiting example shown, the lighting device is a headlamp.

As described below, the observation position of the observer O is taken into account for the projection of the image to be projected Ip. To this end, the image to be projected Ip is deformed in such a way as to be comprehensible to the observer in question, whether this is the driver or a front or rear passenger of the motor vehicle, or an observer outside the motor vehicle.

It is thus helpful to assume the point of view of the observer O for whom the projected image Ip is intended. From the point of view of the observer, the image Ip is not deformed. From a point of view different to that of said observer, the image Ip is deformed.

In non-limiting embodiments, an observer O outside the vehicle is a pedestrian, a driver of another motor vehicle, a cyclist, a motorcyclist, etc. He or she may be located in front, behind or to one side of the motor vehicle V.

In a non-limiting embodiment, the projected image Ip comprises at least one graphic symbol. This graphic symbol helps improve the comfort and/or safety of the observer O. In a non-limiting example, if the observer O is the driver of the motor vehicle, the graphic symbol can represent the speed limit not to be exceeded on the road, a graphic STOP symbol when the motor vehicle is reversing and an obstacle (pedestrian, wall, etc.) is located too close to the motor vehicle, or an arrow that helps when the motor vehicle is about to take a turn on a road, etc.

In a non-limiting example, in the case of an observer O outside the motor vehicle, such as a pedestrian or cyclist, the graphic symbol can be a STOP signal to instruct him or her not to cross in front of the motor vehicle, because it is about to move off again.

In a non-limiting example, in the case of an observer O outside the motor vehicle, such as a driver of a following motor vehicle, the graphic symbol can be a STOP signal if the motor vehicle in question brakes, to instruct the driver of the following vehicle to also brake. In another non-limiting example, if the observer O is outside the motor vehicle and is overtaking in another motor vehicle, the graphic symbol can be a warning symbol to advise the driver of said motor vehicle to pull back in because another motor vehicle is approaching in the opposite direction.

As shown in FIG. 8, the projected image is a STOP symbol. It is oriented on the projection surface S, which is the ground in the non-limiting example shown in this case, in such a way that the observer O can see and understand the STOP symbol. In the non-limiting example shown, the projection is forward of the motor vehicle V and the observer O is outside the motor vehicle V.

The different steps of the projection method MTH are described in detail below.

1) Detecting the Observation Position of the Observer in the Light Module Reference Frame RP In order to detect the observation position PosO1 of the observer O in the light module reference frame RP, it is necessary to detect the position of the observer O himself or herself in the light module reference frame RP. To this end, in a non-limiting example, a camera (not shown) is used. It is designed to detect and calculate the position of an observer O positioned outside the motor vehicle V.

In non-limiting embodiments, the camera is replaced with radar, or lidar.

In the case of an observer O located inside the motor vehicle (driver or passengers), reference observation positions are taken into consideration, for example. Therefore, in a non-limiting example, the driver's eyes are considered to be located in position PosO1 (1.5; −0.5; 1) (expressed in meters) with respect to the light module ML in the case of a motor vehicle that is a car. Naturally, if the motor vehicle is a truck, the position of the eyes relative to the light module ML is different.

For an outside observer, the observation position PosO1 of said observer O, which corresponds to the position of his or her eyes, can be deduced from his or her position. For example, the position of his or her eyes is located approximately 1.5 meters above the ground.

Since detecting the position of the observer in this way is known to a person skilled in the art, it is not described in detail here.

2) Calculating the Observation Position of the Observer in the Image Reference Frame RI The observation position PosO1 of the observer O has previously been determined according to the light module reference frame RP. It is then used for the change of reference system described below.

This step involves a change of reference system. Indeed, it involves shifting from the light module reference frame RP (defined by the axes pjx, pjy, pjz) to the image reference frame RI (defined by the axes lx, ly, lz) of the image to be projected Ip.

The calculation of the observation position PosO2 of the observer O in the image reference frame RI is based on at least one transformation matrix M for transforming the light module reference frame RP to said image reference frame RI.

In a non-limiting embodiment, the position PosO2 takes the following form:

$$\begin{bmatrix} pjx \\ pjy \\ pjz \\ 1 \end{bmatrix}$$

In a non-limiting embodiment, said at least one transformation matrix M takes into account at least one of the following parameters:
- the position PosIp of the image to be projected Ip in the light module reference frame RP;
- the rotation RotIp of the image to be projected Ip in the light module reference frame RP;
- the scale of the image to be projected Ip.

The position PosIp of the image to be projected Ip is deduced from the light module reference frame RP according to a translational movement along the three axes pjx, pjy, pjz of said light module reference frame RP.

In a non-limiting embodiment, the transformation matrix M takes the following form:

$$\begin{bmatrix} a & b & c & t \\ d & e & f & u \\ g & h & i & v \\ 0 & 0 & 0 & 1 \end{bmatrix}$$

in which a, e and i are the affinity terms; b, c, d, f, g and h the rotation terms; and t, u and v the translational movement terms.

The affinity terms a, e and i allow the image Ip to be enlarged or shrunk; for example, the overall size (homothety) can be increased by 50% or reduced by 20%, by increasing the values of a, e and i by 50%, or reducing them by 20%. For example, a value of a, e and i equal to 1 corresponds to a predefined reference dimension of the projected image, in directions pjx, pjy and pjz respectively. It is also possible to apply the enlargement or shrinkage factors in only one of the dimensions, or in two of the dimensions (non-homothetic). It is also possible to apply different enlargement or shrinkage factors to certain dimensions relative to others and, in particular, it is possible to apply different enlargement or shrinkage factors to each dimension. In this way, depending on the position PosO2 of the eyes of the observer O, the decision can be made to project an image in such a way that it appears, to the observer O, to be larger or smaller overall or in certain dimensions, depending on whether the values of a, e and i increase or decrease respectively.

It should be noted that the rotation RotIp depends on the following three angles:
- β: azimuth angle (which indicates whether image to be projected is located to the right or left of the observer, for example when the latter is looking to the right or left);
- Ω: tilt angle (which indicates the inclination of the image to be projected Ip, for example when the observer is tilting his or her head to one side. This means leaning the image Ip over);
- ε: elevation angle (which indicates the desired effect to be given to the graphic symbol of the image Ip).

FIG. 14 shows the elevation and azimuth angles and the plane P1 of the image to be projected Ip.

Thus, PosO2=M*PosO1.

PosO1 is the observation position of the observer O used for the projection of the image Ip in the light module reference frame RP.

PosO2 is the observation position of the observer O used for the projection of the image Ip in the image reference frame RI.

Thus, the position and rotation of the image to be projected Ip are adapted depending on the observer O. In this way, the image to be projected Ip will be comprehensible to the observer O. Therefore, an affine deformation of the image from the desired point of view is obtained, referred to as anamorphosis.

Thus, as seen by a driver of a car, the projected image Ip is not deformed. Similarly, the projected image Ip is also not deformed as seen by a driver of a truck, despite him or her being positioned well above the light module reference frame RP. Finally, the projected image Ip is also not deformed from the point of view of an outside observer.

It should be noted that the projected image Ip can thus be visible to the observer because its projection depends on the observation position of the observer O and the scale of the image can be modulated as desired. Thus, even if he or she is far from the motor vehicle, the observer O will still be able to understand and see the graphic symbol(s) of the projected image Ip.

3) Projecting the image Ip onto the projection surface

This step comprises the following sub-steps:

3a) Calculating a Luminance Map CLUM

In a non-limiting embodiment, the light intensity map CLUX is stored in a memory. It will have already been established during the design of the product, by means of a goniophotometer (not shown). The goniophotometer can, for example, be a type A goniophotometer, i.e. the rotational movement about the horizontal axis supports the rotational movement about the vertical axis adjusted by the rotation about the horizontal axis. The light intensity map CLUX gives the intensity indicators pf of the light module ML considered as a point light source. The direction dir1 of a light ray Rx leaving the light module ML is expressed according to two angles θ and δ and is given by the following formula:

$$\text{direction} = \begin{pmatrix} \cos\theta * \cos\delta \\ \sin\theta \\ \cos\theta * \sin\delta \end{pmatrix}$$

In which δ is the vertical rotation V of the goniophotometer; and θ is the horizontal rotation H of the goniophotometer.

Figure 9:
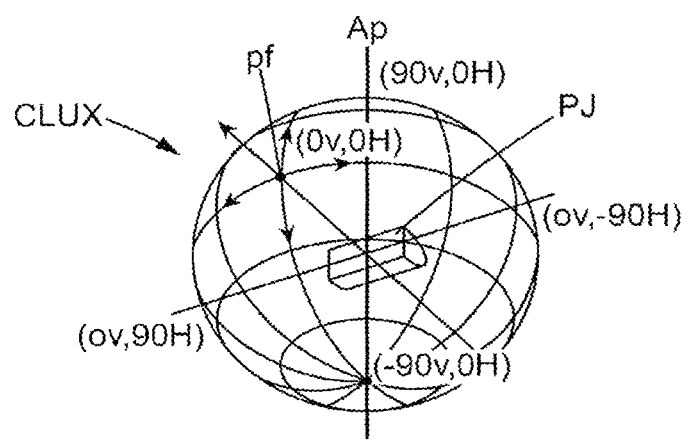
FIG. 9 shows a light intensity map established according to a step of the projection method of FIG. 7 according to a non-limiting embodiment of patent application PCT/EP2016/071596.

The light intensity map CLUX thus comprises a plurality of intensity indicators pf, the direction dir1 of which is given by the above formula, in which θ is the horizontal angle of the intensity indicator pf, and δ is the vertical angle of the intensity indicator pf. The light intensity map CLUX is shown in FIG. 9. In it, an intensity indicator pf with polar coordinates δ=0V, θ=0H can be seen. The light intensity map CLUX can thus be used to determine an intensity I (θ,δ) for a given direction.

Therefore:

CLUX={($\delta_i$, $\theta_j$, $I_{i,j}$),∈[1,M]×[1,N]}, in which M and N are the numbers of discretization points (or intensity indicators) of the light beam Fx in the vertical and horizontal directions respectively.

An intensity indicator pf is therefore defined by its direction dir1 and its intensity I(θ,δ).

Figure 10:
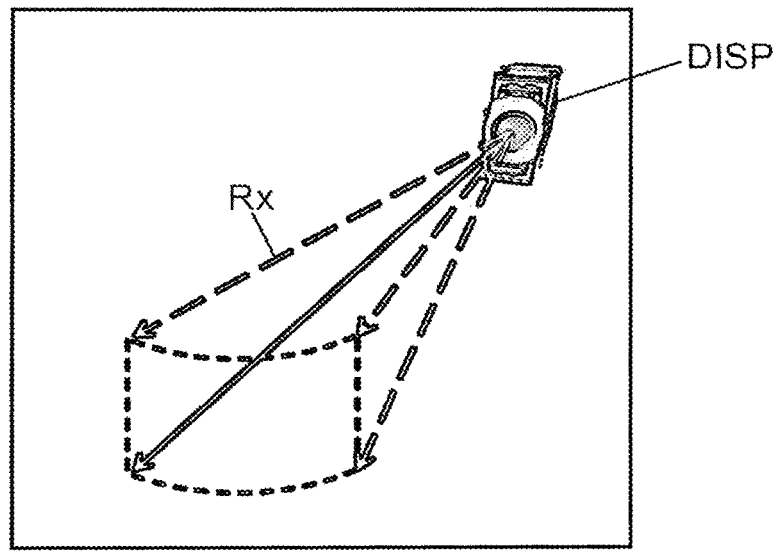
FIG. 10 shows a headlamp incorporating a light module and the direction of a light beam from a light module of said headlamp, said light module being designed to perform at least one step of the projection method of FIG. 7.

FIG. 10 shows a lighting device DISP comprising a light module ML with the direction of a light ray Fx.

Figure 11:
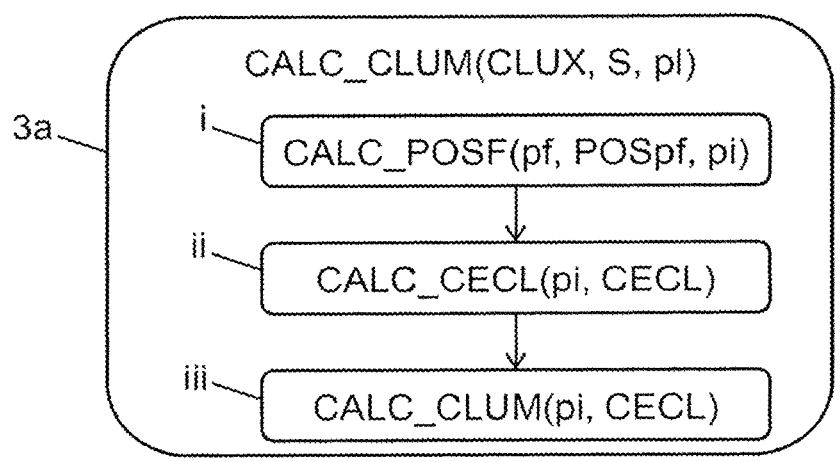
FIG. 11 shows a logical diagram illustrating sub-steps of a step for establishing a luminance map of the projection method of FIG. 7 according to a non-limiting embodiment of patent application PCT/EP2016/071596.

The calculation of the luminance map CLUM on the projection surface S comprises the following sub-steps shown in FIG. 11.
  i) a first calculation of the position POSpf of said intensity indicators pf on the projection surface S resulting in points of impact pi (illustrated step CALC_POSF(pf, POSpf, pi));
  ii) a second calculation of an illumination map CECL of said points of impact pi (illustrated step CALC_CECL (pi, CECL));
  iii) a third calculation of the luminance map CLUM of said points of impact pi from the illumination map CECL resulting in said luminance points pl (illustrated step CALC_CLUM(pi, CECL)).

The different sub-steps are set out in detail below.

It should be noted that the calculations that follow are carried out as a function of the projection surface S (ground S1 or wall S2).

Sub-step i)

The first calculation is based on:
  the position POSpj of the light module ML in the Cartesian reference system x, y, z; and
  the direction dir1 of said previously described intensity indicators pf.

For the ground S1, the position POSpf1 of the intensity indicator pf on the ground in the Cartesian reference system x, y, z is thus obtained with the following formula.

POSpf1=POSpj−(POSpj.z/dir1.z)*dir1.

In which POSpj.z is the z value of the position of the light module ML (height of the light module above the ground) and dir1.z is the z value of the direction vector of the light ray Rx.

For the wall S2, the position POSpf2 of the intensity indicator pf on the wall in the Cartesian reference system x, y, z is thus obtained with the following formula.

POSpf2=POSpj−(D/dir1.x)*dir1.

In which
dir1.x is the x value of the direction vector of the light ray Rx;

D is the distance between the light module ML and the wall. In a non-limiting example, D is equal to 25 meters.

Figure 12:
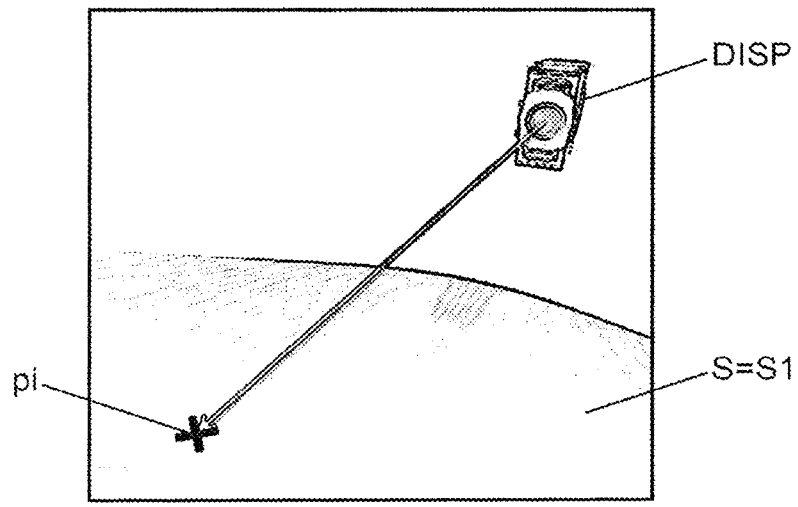
FIG. 12 shows the headlamp of FIG. 10 and a point of impact of the light ray on the ground.

In this way, a point of impact pi (in position POSpf1 or POSpf2) is obtained on the ground S1 or on the wall S2. FIG. 12 shows a non-limiting example of the point of impact pi on a projection surface S that is the ground S1.

Sub-step ii)

Once the point of impact pi on the ground S1 or on the wall S2 has been determined, the illumination E of this point of impact pi is calculated from the intensity I(θ,δ) of the previously determined intensity indicator pf.

Therefore, for the ground S1, the illumination $E_R$ of the point of impact pi on the ground is obtained with the following formula.

$$E_R = -(I(\theta,\delta)/dist1^2)* \cos\theta * \sin\delta$$

In which dist1 is the distance between the point of impact pi and the light module ML.

Therefore, for the wall S2, the illumination $E_M$ of the point of impact pi on the wall is obtained with the following formula.

$$E_m = (I(\theta,\delta)/dist1^2)* \cos\theta * \cos\delta$$

In which dist1 is the distance between the point of impact pi and the light module ML.

Figure 13:
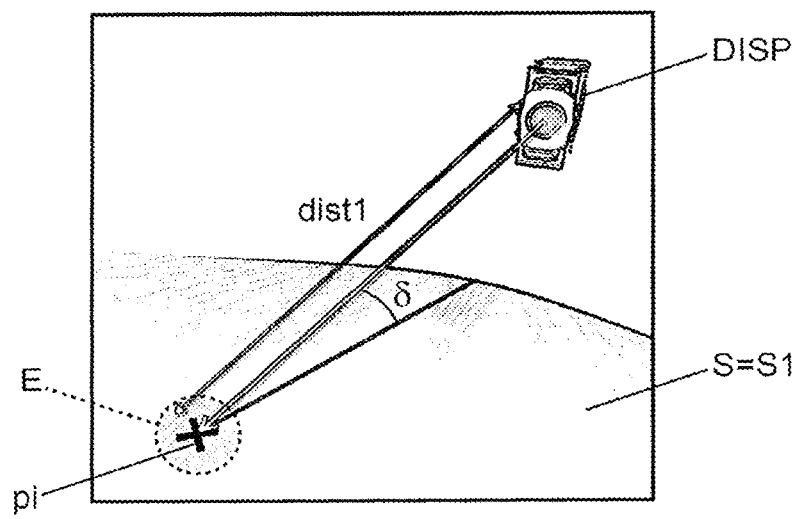
FIG. 13 shows the headlamp of FIG. 12 and the illumination of the point of impact.

FIG. 13 shows the illumination E (delimited by a dotted circle) of a point of impact pi on a projection surface S that is the ground S1.

Sub-step iii)

The third calculation is based on:
  the illumination E of said points of impact pi;
  a position vector Roeil/Moeil between the position of a point of impact pi of the illumination map CECL and the observation position PosO1 of the observer O (in the light module reference frame RP); and
  a light diffusion function d.

d is a known function that can be used to calculate the diffusion of light by the projection surface S. It should be noted that it varies depending on the nature of the projection surface S. For example, the function d is different if the surface is asphalt, concrete, tar, cobblestones, etc.

Therefore, for the ground S1, the luminance $L_R$ of the point of impact pi on the ground is obtained with the following formula.

$$L_R = E_R \frac{d\left(\arccos\left(\frac{R_{oeil}}{\|R_{oeil}\|} \cdot z\right)\right)}{\frac{R_{oeil}}{\|R_{oeil}\|} \cdot z}$$

In which $$\frac{R_{oeil}}{\|R_{oeil}\|} \cdot z$$

is the z value of the normalized vector Roeil.

Therefore, for the wall S2, the illumination $L_M$ of the point of impact pi on the wall is obtained with the following formula.

$$L_M = E_M \frac{d\left(\arccos\left(\frac{M_{oeil}}{\|M_{oeil}\|} \cdot x\right)\right)}{\frac{M_{oeil}}{\|M_{oeil}\|} \cdot x}$$

In which $$\frac{M_{oeil}}{\|M_{oeil}\|} \cdot x$$

is the x value of the normalized vector Moeil.

In a non-limiting embodiment, it is assumed that the projection surface S emits in a uniform manner in all directions. In this case, the diffusion parameter d does not depend on the angles δ and θ.

In a non-limiting embodiment, the projection surface S is considered to be a Lambertian diffuser (for example a grey body). This results in constant luminance on the projection surface S proportional to illumination E and, in this case, the diffusion function d is a cosine.

In this case, $L_R = a/\pi E_R$ because $$L_R = E_R \frac{\frac{\alpha}{\pi} \cdot \cos\left(\arccos\left(\frac{\vec{R}_{oeil} \cdot \vec{z}}{\|\vec{R}_{oeil}\|}\right)\right)}{\frac{\vec{R}_{oeil} \cdot \vec{z}}{\|\vec{R}_{oeil}\|}} = \frac{\alpha}{\pi} E_R$$

in which a is the albedo of the material.
and $L_M = a/\pi E_M$

In non-limiting examples, the albedo of asphalt is 7%, and that of concrete ranges from 17% to 27%.

3b) Calculating the Positions of the Luminance Points pl in the image Reference Frame RI The position PosL1 of a luminance point pl has previously been determined according to the light module reference frame RP. It is then used for the change of reference system described below.

As when calculating the observation position PosO2 of the observer O, this step involves a change of reference system. Indeed, it involves shifting from the light module reference frame RP (defined by the axes pjx, pjy, pjz) to the image reference frame RI (defined by the axes lx, ly, lz) of the image to be projected Ip.

The calculation of the position PosL2 of a luminance point pl in the image reference frame RI is based on said at least one transformation matrix M for transforming the light module reference frame RP to said image reference frame RI (the transformation matrix M described previously).

In a non-limiting embodiment, the position PosL2 is of the same form as the position PosO2 described previously:

$$\begin{bmatrix} pjx \\ pjy \\ pjz \\ 1 \end{bmatrix}$$

It should be noted that the transformation matrix M was described in the section concerning the calculation of the observation position PosO2 of the observer O in the image reference frame RI. It will therefore not be detailed again here.

Thus, PosL2=M*PosL1.

PosL1 is the position of the luminance point pl in the light module reference frame RP.

PosL2 is the position of the luminance point pl in the image reference frame RI.

FIG. 15 shows the image to be projected Ip and the image reference frame RI. Also shown are the luminance point pl and the position of the observer's O eyes (which corresponds to the observation position) with their respective positions PosL2 and PosO2 defined in the image reference frame RI.

It should be noted that, although the image Ip projected on the ground or on the wall is in 2D, (two dimensions), it is possible to obtain a 3D effect (three dimensions), i.e. a perspective or trompe l'oeil effect, by adjusting the elevation angle ε seen previously. The observer O (whether this is the driver, a passenger or an outside observer) will then see the image in perspective. To this end, the elevation angles is greater than −90°.

In particular, it is greater than −90° and less than or equal to 0°. The 3D effect can thus be seen between 0 and −90° (not inclusive).

It should be noted that, at −90°, the image IP is flat on the ground and therefore does not have a 3D effect.

FIGS. 16 to 18 show a projected image Ip that is a pyramid. An observer O who is outside the motor vehicle, such as a pedestrian, is taken as a non-limiting example. The pyramid can be seen from three specific points of view: the point of view of the driver (FIG. 16), the point of view of a rear passenger (FIG. 17) and the point of view of the pedestrian (FIG. 18), but is only seen with a 3D effect from a single point of view. In the non-limiting example shown, only the pedestrian sees the pyramid in 3D (as shown in FIG. 18). From the point of view of the driver or passenger, the pyramid appears to be deformed.

In a non-limiting embodiment, the elevation angle ε is equal to 0. The observer O is looking straight ahead. In this case, the observer O will see the image, i.e. in this case the pyramid, as though it were upright.

In a non-limiting embodiment, the elevation angle ε is substantially equal to −35°.

This makes it possible to produce a raised 3D effect in the direction of the road.

The plane P1 of the image Ip is thus perpendicular to the direction of observation of the observer O.

If the elevation angle ε is different to −90°, the pyramid will thus appear in 3D but will be tilted to a greater or lesser extent.

3c) Defining the Coordinates ply, plz of the Projection plr of a Luminance Point pl As shown in FIG. 19, in a non-limiting embodiment, defining the coordinates ply, plz of the projection plr of a luminance point pl comprises the sub-steps of:
  i) calculating the point of intersection Int between (illustrated sub-step CALC_INT(PosO2, PosL2, P1)):
    the straight line V(PosO2, PosL2) passing through the observation position PosO2 in said image reference frame RI of the observer O and through the position PosL2 in said image reference frame RI of said luminance point pl; and
    the image plane P1 of the image to be projected Ip.

ii) determining the coordinates ply, plz of said point of intersection Int from the dimensions L1, H1 of said image to be projected Ip (illustrated sub-step DEF_CO-ORD(Int, L1, H1).

These two sub-steps are described below.

Sub-step i)

In the image reference frame RI, the point of intersection Int between the straight line (eye position, luminance point) and the image plane P1 is the point on the straight line (eye position, luminance point) where Ix=0. Therefore:

$$Int=PosO2-((PosO2.x)/(V(PosO2, PosL2).x))*V(PosO2, PosL2)$$

In which

V(PosO2, posL2) is the vector representing the straight line (eye position, luminance point) in the image reference frame RI;

V(PosO2, posL2).x is the x value of the vector;

Int is the point of intersection between the straight line (eye position, pl) and the image to be projected Ip in the image reference frame RI. The point of intersection Int is thus the projection plr of the luminance point pl on the image plane P1 of the image to be projected Ip;

PosL2.x is the x value of the position of the luminance point pl;

PosO2.x is the x value of the observation position of the observer.

It should be noted that it is assumed that the observation position of the observer O is positioned on the axis Ix.

FIG. 20 shows the image to be projected Ip, the point of intersection Int that corresponds to the projection plr of the luminance point pl on said plane P1 and the vector V(posO2, posL2) (shown as a dotted line). It should be noted that the projection plr is a central projection, so as to produce a conical perspective effect. Hereinafter, no distinction will be made between the terms projection plr or central projection plr.

Sub-step ii)

The coordinates ply, plz of the central projection plr of the luminance point pl in the image reference RI correspond to the coordinates along the axis ly (vertical) and the axis lz (horizontal) of the position of the previously determined point of intersection Int. In a non-limiting embodiment, they are expressed in meters.

The coordinates of this point in the reference system of FIG. 20 are deduced using the following formulae:

$$ply=(Int.y+(L½))/L1$$

$$plz=Int.z/H1$$

In which,

L1 is the width of the image to be projected Ip (expressed in meters in a non-limiting example);

H1 is the height of the image to be projected Ip (expressed in meters in a non-limiting example);

Int.y is the y value of the point of intersection;

Int.z is the z value of the point of intersection.

FIG. 20 shows the definition of the coordinates ply and plz in meters in the image reference frame RI.

It should be noted that L1 and H1 are input parameters of the projection method MTH.

This sub-step makes it possible to subsequently determine whether the coordinates ply, plz belong to the image to be projected Ip (in which case they need to be between 0 and 1) and, therefore, whether the central projection plr of the luminance point pl belongs to the image to be projected Ip.

To this end, in a non-limiting embodiment, the image to be projected Ip and the coordinates of the projection plr thus calculated are normalized. This helps simplify the test of belonging to the image to be projected Ip.

In this way, a normalized reference system IX (vertical axis), IY (horizontal axis) is obtained, as shown in FIG. 21. The value of the coordinates ply, plz of the projection plr is now between 0 and 1. In the example shown, the axes ly and Iz have become the axes IX and IY respectively. In this way, image dimensions H2, L2 of between 0 and 1 are obtained.

FIG. 21 shows the definition of the coordinates ply and plz in values without units in the image reference frame RI.

It should be noted that the size (L1, H1) of the image to be projected Ip can be defined in this step 3c) or in the step with the transformation matrix M.

Since the dimensions L1, H1 and therefore L2, H2, the position and rotation of the image to be projected Ip are known (these are input parameters of the projection method MTH), it is easy to determine, via its coordinates ply, plz, whether or not the projection pl belongs to the image to be projected Ip.

3d) Defining the Coordinates of the Corresponding Pixel Pix

The row (lig) and column (col) coordinates of the pixel Pix are defined for each projection plr (of luminance point pl) that belongs to the image to be projected Ip, i.e. that is located inside the rectangle L2*H2 of the image to be projected Ip, which has been verified in step 3c-ii).

Thus, if the projection plr belongs to the image to be projected Ip, the coordinates of the corresponding pixel Pix are calculated. They are calculated as follows.

$$Lig=-plz*L2$$

$$Col=ply*H2$$

In which, lig is the row of the pixel;

col is the column of the pixel;

L2 is the width of the image to be projected Ip (this time expressed in pixels);

H2 is the height of the image to be projected Ip (this time expressed in pixels);

ply is the coordinate of the projection plr on the axis IX;

plz is the coordinate of the projection plr on the axis IY.

3e) Correcting the Intensity Value of the Corresponding Intensity Indicator pf

With the coordinates lig, col of the pixel Pix, the value of its color Co can be recovered in the image that is to be projected.

In a non-limiting example, the value is between 0 and 255, ranging from white to black and including several shades of grey in between, as shown in FIG. 22. The term "white" should be taken to mean any unique color and the expression "shades of grey" should be taken to mean the shades of said unique color obtained between its lightest shade and black. Therefore, the projected image does not necessarily consist of the color white and the shades of grey associated with the values of Co of between 0 and 255, but of the darker or lighter shades of any color visible to the human eye. Advantageously, the color is white, yellow, blue, red or amber.

The intensity value Vi of the corresponding intensity indicator pf is then corrected.

It should be noted that this is possible because the light module ML is a digital light module.

In a first non-limiting embodiment, the correction is made as follows:

$$Vi = \sigma \cdot Vi0 * Co/255.$$

In which:
Vi0 is the initial intensity value of the intensity indicator pf of the light module,
Co is the color of the corresponding pixel Pix; and
σ is a maximum over-intensification factor.

In a second non-limiting embodiment, the correction is made as follows: Vi=φ.Co, in which φ is a luminance coefficient. In this way, the luminances are substituted. This makes it possible to display the image on a background independent of the base light distribution.

This step is carried out for all the luminance points pl of which the central projection plr belongs to the rectangle L2*H2 of the image to be projected Ip.

Thus, the light module ML can project, onto the projection surface S, the light beam Fx comprising the light rays Rx with the corrected intensity values Vi of the intensity indicators (step 3f) shown in FIG. 7 PROJ(ML, Fx, pf, Vi). This makes it possible to display the correct color Co for the intensity indicator in question. In this way, the image to be projected Ip is incorporated into the light beam Fx of the light module ML (since it is produced by said light module ML itself) and is projected onto the projection surface S in the correct colors.

Thus, depending on the desired color Co of a pixel Pix, a determined correction factor is applied to the intensity value Vi of the corresponding intensity indicator pf. In this way, it is possible to obtain intensity indicators whose color does not depend on the light intensity of the light beam Fx itself. For example, the projected pyramid shown is uniform in color.

If a light source independent of the light module ML was projecting said pyramid in a superimposed manner onto said light beam, this would not be the case. The pixels of the image would be illuminated to a greater or lesser extent depending on the distribution of light intensity of said light beam. Their color would thus vary depending on the light intensity of said light beam.

Moreover, the fact that the image to be projected Ip is incorporated into said light beam Fx and not superimposed onto it helps improve the contrast of the image on the projection surface S, compared to the result when an independent light source is used. In the case of an independent light source, the light beam also illuminates the projected image. The colors of the latter are therefore lighter.

It should be noted that the color value Co of a pixel, or of a series of pixels corresponding to predetermined portions of the projected image, can also be used to enhance the 3D effect. For example, in reference to FIG. 12, the pixels corresponding to the face F1 of the pattern of the projected image and those corresponding to the face F2 of the pattern of the projected image, can comprise specific and different color values Co. Thus, the face F1 appears to be brighter than the face F2, or vice versa, depending on whether the value of the color Co corresponding to the pixels that form the face F1 is greater than or less than that which corresponds to the pixels forming the face F2. The value of the color Co corresponding to the pixels forming the face F1 and/or F2 can also vary in such a way as to produce a gradient effect, for example from one side to the other of the face F1 and/or F2, helping further enhance the 3D effect.

It is possible to obtain multi-colored images by using several systems functioning according to the abovementioned method and each emitting a visually different color. The images projected by each system are then calculated to be projected onto the projection surface S in a superimposed manner, so as to obtain a multicolor overall projected image.

It should be noted that, since the projection of the image to be projected Ip depends on the observation position of the observer O, it is therefore updated continuously depending on the movement of the observer O relative to the motor vehicle when the observer is outside the motor vehicle, and depending on the movement of the motor vehicle itself when the observer O is inside the motor vehicle. In a non-limiting embodiment, the frequency with which the calculations set out above are refreshed thus depends on the speed of movement of the observer relative to the motor vehicle, in the case of an outside observer. The higher the speed, the higher the refresh frequency. The lower the speed, the lower the refresh frequency.

In another non-limiting embodiment, the frequency with which the calculations set out above are refreshed is constant. In a non-limiting example, the frequency is one second.

Therefore, since these calculations are carried out in real time, it is not necessary to have a database with images of a same graphic symbol pre-loaded in the memory corresponding to several imaginable observation positions of the observer relative to the motor vehicle (in the case of an outside observer), or in the motor vehicle (when he or she is inside).

The projection method MTH thus makes it possible to project one or more images Ip onto a projection surface S in such a way as to be not only visible to an observer located inside or outside the motor vehicle, but also comprehensible to him or her, because the projected image Ip is oriented in the direction in which said observer O is looking.

It should be noted that, in the case in which several images Ip are projected at the same time, the combination of different images with the light beam Fx is calculated before projecting the overall result.

In a non-limiting embodiment, the projection method MTH is implemented by a lighting device DISP for a motor vehicle V.

In a non-limiting embodiment, the lighting device DISP can be used to perform a regulatory photometric function such as a low beam or a high beam, or a front, rear and/or side indicator function. Thus, the lighting device is located at the front of the motor vehicle or at the rear.

The lighting device DISP is shown in FIG. 17. It comprises a processing unit PR and at least one light module ML. In non-limiting embodiments, the lighting device is a headlamp or a tail light.

The processing unit PR is suitable for:
detecting an observation position PosO1 of an observer O in a light module reference frame RP (illustrated function DET_POS(O, PosO1, RP));
calculating the observation position PosO2 of the eyes of the observer O in an image reference frame RI (illustrated function DET_POS(O, PosO2, RI));

Said lighting device DISP is capable of projecting said image Ip onto said projection surface S depending on said observation position PosO2 of the observer O in the image reference frame RI, said image Ip being incorporated into said light beam Fx of the light module ML (illustrated function PROJ(Fx, Ip, S)).

For the projection of said image Ip onto said projection surface S, the processing unit PR is further suitable for:
from a light intensity map CLUX of the light module ML comprising a plurality of intensity indicators pf, calculating a luminance map CLUM on the projection surface S resulting in luminance points pl (illustrated function CALC_CLUM(CLUX, S, pl));

calculating the position PosL2 of each luminance point pl in the image reference frame RI (illustrated function CALC_POS(pl, PosL2, O, RI));

from its position PosL2 and the observation position PosO2 of the observer O in said image reference frame RI, defining the coordinates ply, plz of the projection plr of each luminance point pl in the image plane P1 of said image to be projected Ip (illustrated function DEF_PLR(plr, P1, PosL2, PosO2));

if said projection plr belongs to said image to be projected Ip, defining the coordinates lig, col of the corresponding pixel Pix (illustrated function DEF_PIX(pl(lig, col), ply, plz));

for each projection plr of a luminance point pl belonging to said image to be projected Ip, correcting the intensity value Vi of the corresponding intensity indicator pf depending on the color Co of the corresponding pixel Pix (illustrated function MOD_PF(pf, Vi, Pix, Co)).

For the projection of said image Ip onto the projection surface S, the light module ML is capable of projecting the light beam Fx onto the projection surface S with the corrected intensity values VI of the intensity indicators pf (illustrated function PROJ(ML, Fx, Vi, pf)).

It should be noted that the processing unit PR is incorporated into the light module ML or is independent of said light module ML.

Naturally, the description of patent application PCT/EP2016/071596 filed on 13 Sep. 2016 is not limited to the embodiments described above.

Thus, in another non-limiting embodiment, a type B goniophotometer can also be used, i.e. the rotational movement about the vertical axis supports the rotational movement about the horizontal axis.

Thus, in another non-limiting embodiment, the processing unit PR can be offset from the lighting device DISP.

Thus, the step of calculating the observation position PosO2 in the image reference frame RI can be carried out before or at the same time as the calculation of the luminance position PosL2.

Thus, the motor vehicle V comprises one or more lighting devices DISP suitable for implementing the described projection method MTH.

Thus, the present patent application PCT/EP2016/071596 has, in particular, the following advantages:

it makes it possible to project an image comprising at least one graphic symbol that helps improve the comfort and/or the safety of an observer who is inside or outside the motor vehicle;

it makes it possible to project an image that is visible and comprehensible to a determined observer because said projection depends on the position of said observer; thus, the same projection method is applied to project an image comprehensible to the driver or to project an image comprehensible to a pedestrian or indeed to a driver in a following vehicle, for example; it allows the image to be projected Ip to be deformed in such a way as to be comprehensible to a determined observer. Therefore, an anamorphosis of an image is created, said anamorphosis depending on the observation position of the observer O;

the observation position of the observer in the image reference frame depends on the position and rotation of said image to be projected. As a result of the rotation, which depends particularly on an elevation angle, when the latter is adjusted in a particular manner, the observer has the impression of viewing a 3D image;

it makes it possible to incorporate the information to be projected into the light beam Fx of the light module ML of the motor vehicle. It is not necessary to have a dedicated additional light source;

thus, contrary to a prior art document that displays an image directly on the window of the tail light of the motor vehicle and that can appear too small at a certain distance, the invention does allow an outside observer located at a certain distance from said motor vehicle to see the image, because it is projected according to the position of the observer himself or herself and onto a projection surface that is not the window of a light of the motor vehicle. The dimensions of the image to be projected Ip are no longer limited to a small projection surface such as the window of the light;

it makes it possible to propose a solution that can be used for a recipient of the information who can only see the front or sides of the motor vehicle, for example, unlike a solution that displays an image on the tail lights of the motor vehicle;

it makes it possible to propose a solution other than the displaying of an image or images on the tail lights of the motor vehicle;

it makes it possible to propose a solution other than the displaying of an image or images dedicated only to the driver of the motor vehicle.

The invention claimed is:

1. A projection method for projecting at least one image, by a projection system of a motor vehicle, the method comprising:

detecting a disruption area by circuitry of the motor vehicle;

transmitting a warning signal;

upon receiving the warning signal,
determining a position of a driver of the motor vehicle in a predefined reference frame;
calculating a transformation matrix for transforming an image depending on the determined position of the driver;
generating a control signal by applying the transformation matrix to transform the at least one image representing a pictogram stored in the circuitry;

projecting, based on a detected position of an observer outside of the motor vehicle, the at least one image transformed including the pictogram to the disruption area on a roadway in such a way that the pictogram is observable and understood by the observer outside of the motor vehicle; and generating a ripple effect in a pattern that is displayed with more or less intensity in a background beam creating a light environment on which the pictogram is included and attracting an attention of the observer with the rippling effect.

2. The projection method according to claim 1, wherein the transformation matrix is designed to pivot the stored pictogram by an angle of 90° relative to a horizontal axis extending over the roadway, said horizontal axis being perpendicular to a direction of a movement of the motor vehicle.

3. The projection method according to claim 1, wherein the generating the control signal further comprises adding at least one area of shadow to the at least one transformed image such that the pictogram shown in the at least one transformed image is perceived in 3D by said driver.

4. The projection method according to claim 1, wherein the detecting the disruption area comprises:
  determining a geographical position of the motor vehicle;
  receiving an electromagnetic signal indicating the disruption area on the roadway;
  determining a possibility of the motor vehicle travelling through the disruption area; and
  producing the warning signal when the motor vehicle is going to travel through the disruption area.

5. The projection method according to claim 4, wherein the electromagnetic signal is a radio-frequency signal chosen from one of a program signal, a wireless telecommunication network signal, and a computer network signal governed by a communication protocol defined by IEEE 802.11 group standards.

6. The projection method according to claim 4, wherein the electromagnetic signal is a light signal that has a wavelength of between 400 and 800 nanometers.

7. The projection method according to claim 1, wherein the detecting the disruption area comprises:
  acquiring at least one image representative of the roadway by a camera of the projection system;
  processing said at least one acquired image in order to detect an existence of the disruption area; and
  producing the warning signal.

8. The projection method according to claim 1, wherein the pictogram is an image representative of an element chosen from one or more of a traffic cone, a road sign, lines arrows, guide arrows, and temporary work signs.

9. The projection method according to claim 1, further comprising capturing an image of the driver of the motor vehicle, wherein the determining the position of the driver in the predefined reference frame is referred to as a projection reference frame implemented from the captured image.

10. A projection system for projecting at least one image, for a motor vehicle, said projection system comprising:
  circuitry configured to:
    store the at least one image representing a pictogram;
    detect a disruption area;
    generate a warning signal upon detection of the disruption area;
    calculate a transformation matrix depending on a position of a driver of the motor vehicle;
    generate a control signal by applying the transformation matrix to transform the at least one image representing the pictogram stored in the circuitry;
    project, based on a detected position of an observer outside of the motor vehicle, the at least one transformed image including the pictogram to the disruption area on a roadway in such a way that the pictogram is observable and understood by the observer outside of the motor vehicle; and
    generate a ripple effect in a pattern that is displayed with more or less intensity in a background beam to create a light environment on which the pictogram is included and attract an attention of the observer with the rippling effect.

11. The projection system according to claim 10, wherein the circuitry is further configured to emit a light beam.

12. The projection system according to claim 10, wherein the circuitry is further configured to capture an image of the driver of the motor vehicle, determine a position of the driver in the captured image, and define the transformation matrix from the determined position of the driver.

13. The projection method according to claim 2, wherein the generating the control signal further comprises adding at least one area of shadow to the at least one transformed image such that the pictogram shown in the at least one transformed image is perceived in 3D by said driver.

14. The projection method according to claim 2, wherein the detecting the disruption area comprises:
  determining a geographical position of the motor vehicle;
  receiving an electromagnetic signal indicating the disruption area on the roadway;
  determining a possibility of the motor vehicle travelling through the disruption area; and
  producing the warning signal when the motor vehicle is going to travel through the disruption area.

15. The projection method according to claim 2, wherein the detecting the disruption area comprises:
  acquiring at least one image representative of the roadway by a camera of the projection system;
  processing said at least one acquired image in order to detect an existence of the disruption area; and
  producing the warning signal.

16. The projection method according to claim 2, wherein the pictogram is representative of an element chosen from one or more of a traffic cone, a road sign, lines arrows, guide arrows, and temporary work signs.

17. The projection method according to claim 1, further comprising capturing an image of the driver of the motor vehicle, wherein the determining the position of the driver in the predefined reference frame is referred to as a projection reference frame implemented from the captured image.

18. The projection method according to claim 3, wherein the detecting the disruption area comprises:
  determining a geographical position of the motor vehicle;
  receiving an electromagnetic signal indicating the disruption area on the roadway;
  determining a possibility of the motor vehicle travelling through the disruption area; and
  producing the warning signal when the motor vehicle is going to travel through the disruption area.

19. The projection method according to claim 3, wherein the detecting the disruption area comprises:
  acquiring at least one image representative of the roadway by a camera of the projection system;
  processing said at least one acquired image in order to detect an existence of the disruption area; and
  producing the warning signal.

* * * * *